3,325,273
HERBICIDAL METHOD UTILIZING GLYCOL ESTERS OF 2,3,6-TRICHLOROPHENYLACETIC ACID AS HERBICIDES

Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Apr. 12, 1965, Ser. No. 447,516
5 Claims. (Cl. 71—2.6)

This application is a continuation-in-part of Ser. No. 101,060, filed in the United States Patent Office Apr. 6, 1961, which is a continuation-in-part of Ser. No. 730,051, filed in the United States Patent Office, Apr. 22, 1958, both now abandoned.

This invention relates to the use of herbicidal compositions of matter derived from 2,3,6-trichlorophenylacetic acid. More specifically, it is of a herbicidal method utilizing the polyhydric aliphatic alcohol esters of 2,3,6-trichlorophenylacetic acid, which have superior characteristics as herbicides and soil sterilants, as compared to the 2,3,6-trichlorophenylacetic acid and its monohydric alcohol esters.

The novel compositions of this invention are derived from the esterification of 2,3,6-trichlorophenylacetic acid with the desired aliphatic polyhydric alcohol containing 2 to 6 hydroxyl groups, e.g., glycol or by reaction of the corresponding acid chloride with the desired polyhydric alcohol.

Among the many compounds intended to be within the purview of this invention are: ethylene glycol mono-2,3,6-trichlorophenylacetate, ethylene glycol bis-2,3,6-trichlorophenylacetate, diethylene glycol mono-2,3,6-trichlorophenylacetate, diethylene glycol bis-2,3,6-trichlorophenylacetate, triethylene glycol mono-2,3,6-trichlorophenylacetate, triethylene glycol bis-2,3,6-trichlorophenylacetate, propylene glycol mono-2,3,6-trichlorophenylacetate, propylene glycol bis-2,3,6-trichlorophenylacetate, polyethylene glycol mono-2,3,6-trichlorophenylacetate, polyethylene glycol bis-2,3,6-trichlorophenylacetate, glycerol mono-2,3,6-trichlorophenylacetates, glycerol bis-2,3,6-trichlorophenylacetates, glycerol tris-2,3,6-trichlorophenylacetates, sorbitol 2,3,6-trichlorophenylacetates, mannitol 2,3,6-trichlorophenylacetates, butylene glycol 2,3,6-trichlorophenylacetates, pentaerythritol 2,3,6-trichlorophenylacetates, dipentaerythritol 2,3,6-trichlorophenylacetates and trimethylolpropane 2,3,6-trichlorophenylacetates.

The high cost of labor and farm machinery have made the hand or machine suppression or eradication of weeds economically unfeasible. For this reason, there has become an increasing tendency on the part of growers to rely more and more on chemical control of weeds through the use of herbicides. Since herbicides structurally comprise many diverse classes of substances, it is not surprising that different crops differ markedly in their sensitivity or resistance to the vast number of herbicides now in commercial use. Thus, while a high degree of phytotoxicity against a broad spectrum of weeds, selectivity and ease of formulation are still the sine qua non of a herbicide, the volatility and persistence of a herbicide play an important part in its commercial acceptance. High volatility, particularly, is a serious drawback to the use of herbicides in areas where there are herbicide-sensitive crops in the vicinity of the weeds to be controlled. For example, 2,4-dichlorophenoxyacetic acid (2,4–D), and especially its esters, are especially phytotoxic toward certain broadleaf crops, such as cotton, soybean, tobacco and tomatoes. Unfortunately, 2,4–D and especially its esters, also has a relatively high volatility, thus through natural vaporization, considerable quantities of this herbicide are carried for rather long distances from the place of application. Thus, in many instances, susceptible crops have been damaged through the vaporized herbicide, causing heavy financial loss to the grower. For this reason, in many areas of the country the use of 2,4–D and especially its esters, is restricted or prohibited. This is especially true in areas where cotton, tobacco, tomatoes and truck crops are important.

Similarly, the volatility of 2,3,6-trichlorophenylacetic acid has greatly restricted its use. However this problem is not solved by making the less volatile aliphatic esters. The reason for this is that while the volatility of the simple aliphatic esters is reduced as the chain length increases, there is a corresponding sharp reduction of herbicidal activity making the simple aliphatic esters of little commercial value. Unexpectedly, it has been found that the compositions of this invention not only have low volatility, but retain their high degree of herbicidal activity, thus enabling these novel herbicides to be used where 2,4–D, 2,3,6-trichlorophenylacetic acid and the aliphatic monohydric alcohol esters of 2,3,6-trichlorophenylacetic acid would be precluded.

While low volatility is an important attribute of the compositions of this invention, an equally important advantage of these herbicidal compositions is that their phytotoxicity toward many weeds persists for long periods of time after their application to the soil. In this regard, the ethylene glycol mono- and bis-esters are undoubtedly the most valuable compounds of the inventive composition, as they not only offer the advantage of long duration, but are by far the fastest acting herbicides of the inventive class. As in the case of low volatility, the reason for this long term persistence in the soil is not obvious or well understood. For this reason, no theory of operation or mechanism is advanced, but it is a major factor in the value of these compositions as soil sterilants, in volume crops such as sugar cane where frequent hand or mechanical cultivating is economically prohibitive. In addition, these compositions because of the low cost and high phytotoxicity toward a variety of weeds and grasses are especially useful as soil sterilants on low grade land such as public and private thoroughfares, road shoulders, railroad beds, rights of way, and drainage and irrigation ditches. The compositions are especially phytotoxic toward weeds and grasses including among others, quackgrass, wild bluegrass, Johnson grass, wild carrot, ragweed, chicory, Canadian thistle, plantains, oxalis, daisy, yarrow, foxtail, bindweed, milkweed, mustard and dock. An ancillary effect of the low volatility and long lasting phytotoxicity of the inventive compositions is that they are especially advantageous in areas of high rainfall or in drainage and irrigation ditches where conventional herbicides such as the free 2,3,6-trichlorophenylacetic acid are leached out or lose their effectiveness. Thus, in crops such as pineapple, sugar cane and rice and the like, the herbicide need only be applied once during the growing season to effect full control of the weed population.

The compounds of this invention may be utilized as either the highly purified product or as the technical crude as well as states of purity intermediate to these purity extremes. They may be applied by themselves or diluted with liquid or solid carriers or diluents. Other herbicides, fungicides, insecticides or soil sterilants may be used as the diluents. For example, the compositions may be combined with other herbicides such as the 2,4-dinitro-6-alkylphenols, pentachlorophenol, ammate, the phenylureas such as N-m-trifluoromethylphenyl-N'-N'-dimethylurea, N-p-chlorophenoxyphenyl-N'-N'-dimethylurea, linuron, monuron or diuron, the triazines such as 2,4-dialkylamino-6-methoxy-sym-triazines, 2,4-dialkylamino-6-methylthio-sym-triazine, 2,4-dialkylamino-6-chloro-sym-triazine, the chlorophenoxyaliphatic acid such as 2,4-D and 2,4,5-T, the trichloroacetates, chlorates, dichloropropionates, borates, S-alkyl-N,N-dialkylthiocarbamates, α-chloro-N-substituted acetamides, α-chloro-N,N-disubstituted acetamides such as α-chloro-N,N-dialkyl-acetamide, the chlorobenzoic acids such as trichloro- and polychlorobenzoic acids, trichloroaminopicolinic acid, aminotriazole, diphenylacetamides, dichlorobenzonitriles, herbicidal uracils, 3-amino-2,5-dichlorobenzoic acid, and the like. Optionally, the compositions may be combined with fungicides such as sulfur, captan or the metal dimethylthiocarbamates. Typical compatible insecticides are malathion, chlordane, DDT, benzene hexachloride and the like. Soil sterilants such as the alkali and alkaline earth metal chlorates and borates, and the above mentioned triazines and ureas appear to have an enhanced effect greater than additive, by combination with the inventive compositions.

The compositions of this invention readily lend themselves to formulation ranging from the simple to most complex. They may be mixed with the conventional pest control and herbicide adjuvants, modifiers, diluents or conditioning agents so that they may be formulated as solutions, emulsions, dispersions, wettable powders or dusts. The diluents may be solids of varying particle size such as sawdust, clay, earth, mica, cereal flours, starches, diatomaceous earth and the like. Typical liquid carriers among others are water, petroleum fractions, liquid aliphatic or aromatic alcohols, esters, glycols and ketones. The liquid formulations whether solutions or dispersions, emulsions or wettable powder dispersions, may contain as a conditioning agent one or more surface active agents in amounts sufficient to impart the desired characteristics to the formulation. By the term surface active agent are included wetting agents, dispersing agents, emulsifying agents and the like. A list of such agents which are satisfactory may be found in "Detergents and Emulsifiers" published by John W. McCutcheon, Inc., Morristown, N.J., 1962.

There is considerable latitude and variation possible as to the mode and time of application of the inventive herbicidal compositions. For example, the compositions may be hand or machine broadcast, or disced or plowed into the soil or applied as a foliar spray, or as spray on the soil. The preferable procedure is to broadcast or spray the composition on the soil prior to weed emergence. There is no special or critical time of application, this being largely determined by the convenience and preference of the user, except in the case of use in sugar cane where the preferred timing is at planting, at spring cultivation or at layby.

Similarly, the rate of application of the herbicidal composition is varied from one-half to one hundred pounds per acre, usually within the range of one to fifty pounds per acre, dependent upon several factors such as soil structure, climatic conditions, the stage of growth of the weed and crop, the type of weed or crop as well as whether sterilization or mere eradication of the weeds is sought. The preferred application rate depending upon so called average field conditions will be as follows: for controlling weeds for the few months of growing season in crop of average phytotoxic susceptibilities such as corn the rate will generally range from one to eight pounds per acre. Where weeds are to be eradicated from a more herbicide-resistant crop such as sugar cane, the rate of application will range from three to twelve pounds per acre while where the weeds to be eradicated are especially resistant mature plants of several years growth or long term total sterilization up to two to five years is desired, a range of ten to one hundred pounds per acre or higher may be used. Obviously, in soil sterilization the upper limit of rate of application is largely dictated by economic considerations.

To illustrate the workings of this invention, representative non-limitative examples of the preparations, formulations and use of the invention are given below, in which parts are given by weight and temperatures are in degrees centigrade, unless otherwise stated.

*Example 1.—Preparation of 2,3,6-trichlorophenylacetic acid*

To a solution of 37.5 parts by weight of sodium cyanide in forty parts by weight of water and one hundred and fifty parts by weight of ethyl alcohol maintained at reflux was added slowly one hundred and thirty-eight parts of 2,3,6-trichlorobenzyl chloride (prepared by the chlorination of 2,3,6-trichlorotoluene at a temperature ranging from ninety to one hundred and thirty degrees centigrade under the influenced of a two hundred and fifty watt mercury vapor lamp). The reaction mixture was refluxed for four and one-half hours, filtered, evaporated to a solid and recrystallized several times from aqueous methanol. The product is a colorless crystalline solid melting at 58.9 degrees centigrade, identified as 2,3,6-trichlorobenzyl cyanide. When five hundred and eighty-eight parts by weight of the cyanide were heated for an hour with one thousand, eight hundred and sixteen parts by weight of sixty-five percent aqueous sulphuric acid at reflux temperature, and the reaction product washed with water and recrystallized from benzene, the pure colorless crystalline 2,3,6-trichlorophenylacetic acid melting at one hundred and sixty-one degrees centigrade was produced.

*Example 2.—Preparation of 2,3,6-trichlorophenylacetyl chloride*

Ten parts by weight of the 2,3,6-trichlorophenylacetic acid were heated for thirty minutes with forty parts by weight of thionyl chloride at the reflux temperature. The excess thionyl chloride was removed by distillation and the product distilled in a short path still yielding a nearly colorless liquid, boiling point one hundred and thirty-seven to one hundred and thirty-eight degrees centigrade (five millimeters), one hundred and twenty-nine to one hundred and thirty-one degrees centigrade (one millimeter) $N_{25}^D$ 1.5795.

*Analysis.*—Calcd. for $C_8H_4Cl_4O$: Cl, 55.1%. Found: Cl, 55.1%.

*Example 3.—Polyoxyethylene 2,3,6-trichlorophenylacetate*

Nine parts of 2,3,6-trichlorophenylacetyl chloride were heated at ninety to one hundred degrees centigrade with sixty parts of Carbowax 1500 (a commercial ethylene oxide polymer of molecular weight five hundred to six hundred). A vacuum was applied to remove the hydrogen chloride as it was formed. After one hour, an infrared spectrum of the reaction mixture revealed that no detectible organic acids or acid chlorides were present, but an intense absorption band characteristic of the ester carbonyl group was present at 5.74 microns.

A similar result is obtained with Carbowax 1540 (an ethylene oxide polymer of molecular weight above one thousand).

Both of these products are surface-active and capable of emulsifying benzene and water.

*Example 4.—Ethylene glycol 2,3,6-trichlorophenyl-acetate mono- and bis-esters*

Twenty-five parts of ethylene glycol and thirteen parts of 2,3,6-trichlorophenylacetyl chloride were heated under vacuum at one hundred degrees centigrade for one hour. Then two hundred parts of water and one hundred parts of benzene were added and agitated with the reaction mixture. The benzene layer was then separated, washed with water, with dilute sodium bicarbonate solution, and again with water, then dried over soda ash and stripped of solvent. The residual syrup was a separable mixture of the mono- and di-esters.

*Analysis.*—Calcd. for mono-estes $C_{10}H_9Cl_3O_3$: Cl, 37.7%. Calcd. for di-ester $C_{18}H_{12}Cl_6O_4$: Cl, 42.1%. Found: Cl, 40.7%.

The mixture was subjected to distillation in a short-path still. A viscous liquid distillate, boiling point one hundred and forty-five to one hundred and fifty-five degrees centigrade (one micron pressure), was taken off. This was proved by analysis to be the mono-ester.

*Analysis.*—Calcd. for $C_{10}H_9Cl_3O_3$: Cl. 37.7%. Found: Cl, 37.4%.

The residual undistillable material was a waxy semi-solid having the correct analysis for the diester. Its infrared spectrum showed the absence of an —OH group.

*Analysis.*—Calcd. for $C_{18}H_{12}Cl_6O_4$: Cl, 42.1%. Found: Cl, 41.8%.

*Example 5.—Triethylene blycol 2,3,6-trichlorophenylacetate*

A mixture of fifty parts of triethylene glycol and thirteen parts of 2,3,6-trichlorophenylacetyl chloride was heated at one hundred degrees centigrade for one hour under vacuum. The resultant mixture was worked up as in the foregoing example to yield eleven parts of a colorless syrup slightly contaminated with triethylene glycol.

*Analysis.*—Calcd. for mono-ester $C_{14}H_{17}Cl_3O_5$: Cl, 28.7%. Found: Cl, 26.9%.

*Example 6*

A mixture of two hundred and sixty-four parts of 2,3,6-trichlorophenylacetic acid, thirty-one parts of ethylene glycol, two hundred and fifty parts of xylene, and four parts of p-toluenesulfonic acid was heated to reflux at one hundred and ten to one hundred and thirty degrees in a distillation apparatus fitted with a distillate receiver permitting continuous separation of water and xylene layers and reflux of the xylene back to the heated vessel. When the theoretical weight of water had been collected, the mixture was diluted with an equal volume of xylene, then washed with water and five percent sodium bicarbonate solution, then stripped free of xylene leaving a waxy oily light brown residue in eighty-two percent yield.

*Analysis.*—Calcd. for $C_{18}H_{12}O_4Cl_6$: Cl, 42.1%. Found: Cl, 41.8%.

*Example 7.—Test method for relative herbicidal activity*

Plots infested with seeds of ragweed, lambsquarters, pigweed, witchgrass, mustard, oxalis, purslane, and foxtail were sprayed with aqueous dispersions of the various test chemicals at rates of four pounds per acre prior to weed emergence. One month later, the plots were inspected for percent weed control relative to untreated check areas. The results are presented in Table I below.

*Example 8.—Volatility injury test method*

Tomato plants, three to four inches in height, in soil contained in non-porous pots, were placed in the center of the above test plots, and four thousand milliliter beakers inverted over the pots. Consequently, the tomato plants were exposed by vapor action only to the herbicide present in the soil of these plots. The purpose of the inverted beakers was to confine the vapors thereby avoiding effects of wind.

Within tbout two days, severe injury, due to epinastic effects (twisting of stems, epicotyls, and curling of leaves) were noted in the case of the plants in the plots treated with methyl, isopropyl, and n-butyl esters. Lesser or more delayed injurious effects were noted with other alkyl esters and with the free acid, and no injury or slight effects were noted with the various polyhydric alcohol esters. These effects were all rated on a scale of severity from 0 (no effect) to 10 (most severe). Weed control and volatility injury rating are shown in the following table:

TABLE I

| Ester | Percent Control | Volatility Injury |
|---|---|---|
| Methyl | 100 | 10 |
| Isopropyl | 90–100 | 10 |
| n-Butyl | 70 | 10 |
| Hexyl | 30 | 5 |
| 2-ethylhexyl | 20 | 3 |
| Lauryl | 10–20 | 2 |
| Ethylene glycol mono- | 90–95 | 1 |
| Ethylene glycol bis- | 100 | 0 |
| Diethylene glycol bis- | 85–90 | 0 |
| Glycerol bis- | 90 | 0 |
| Glycerol tris- | 90–95 | 0 |
| Free acid | 90 | 5 |

*Example 9*

A mixture of thirty-four hundred and five parts 2,3,6-trichlorophenylacetic acid, eight hundred and seventy-nine parts of ethylene glycol, twenty-three hundred and ten parts of trichloroacetic acid, and thirty-five hundred parts of toluene was refluxed for twelve hours with continuous decantation and removal of the water layer of the distillate and continuous recycle of the toluene layer of the distillate. The mixture was then cooled, washed with water, and the toluene stripped off under aspirator vacuum to a pot temperature of one hundred and twenty-eight degrees. The residual liquid was shown to be the mixed ethylene glycol ester of trichloroacetic acid and trichlorophenylacetic acid by its infrared spectrum, which resembled very closely a superimposition of the spectrum of the two individual ethylene glycol bis esters. However, on distillation, only about ten percent could be taken off in the range of one hundred and forty to one hundred and fifty degrees (two millimeters), the known boiling range of ethylene glycol bis (trichloroacetate), so that it is established that a major part of the mixture must consist of the unsymmetrical ester wherein the two acid moieties are attached to the same glycol molecule. This compound is believed to have the structural formula:

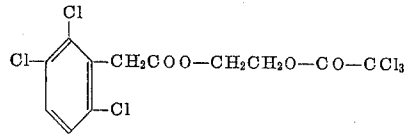

The unsymmetrical structure of this compound greatly enhances its herbicidal properties.

*Example 10*

A physical mixture of the ethylene glycol bis (2,3,6-trichlorophenylacetate), and ethylene glycol bis (trichloroacetate) was made by mixing at room temperature equimolar amounts of the two separately-made esters. This mixture was compared to the product of the foregoing example, by applying each at the rate of two pounds per acre to plots seeded with ryegrass and millet (representative of grassy weeds), prior to emergence of the weeds. Six weeks later, percent control of these grasses was determined relative to untreated comparison plots, with the following results:

| Chemical | Percent control of Ryegrass | Percent control of Millet |
|---|---|---|
| Product of Example 9 | 90 | 100 |
| Physical mixture of equimolar amounts of the two esters as described above | 30 | 50 |

Although certain preferred embodiments of the invention have been disclosed for the purpose of illustration it will be evident that various changes and modifications may be made therein without departing from the scope and spirit of this invention.

What is claimed is:

1. A method for controlling the growth of plants which comprises applying to the locus to be treated a phytotoxic amount of an ester of 2,3,6-trichlorophenylacetic acid and a lower aliphatic polyhydric alcohol, which ester is selected from the group consisting of ethylene glycol mono-2,3,6-trichlorophenylacetate, ethylene glycol bis(2,3,6-trichlorophenylacetate), diethylene glycol bis(2,3,6-trichlorophenylacetate), glycerol bis(2,3,6-trichlorophenylacetate) and glycerol tris(2,3,6-trichlorophenylacetate).

2. A method according to claim 1 wherein the ester applied is ethylene glycol mono-2,3,6-trichlorophenylacetate.

3. A method according to claim 1 wherein the ester applied is ethylene glycol bis(2,3,6-trichlorophenylacetate).

4. A method according to claim 1 wherein the ester applied is glycerol bis(2,3,6-trichlorophenylacetate).

5. A method according to claim 1 wherein the ester applied is glycerol tris(2,3,6-trichlorophenylacetate).

References Cited

UNITED STATES PATENTS

| | | | |
|---|---|---|---|
| 2,577,969 | 12/1951 | Jones | 71—2.6 |
| 2,693,407 | 11/1954 | Swezey | 71—2.3 |
| 2,817,676 | 12/1957 | Pumpelly | 71—2.6 X |
| 2,977,212 | 3/1961 | Tischler | 71—2.6 |

LEWIS GOTTS, *Primary Examiner.*

JAMES O. THOMAS, Jr., *Examiner.*

ALBERT J. ADAMCIK, *Assistant Examiner.*